(12) United States Patent
Laiho

(10) Patent No.: US 6,522,655 B1
(45) Date of Patent: Feb. 18, 2003

(54) METHOD AND APPARATUS IN A TELECOMMUNICATIONS SYSTEM

(75) Inventor: Keijo Laiho, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/309,296

(22) Filed: May 11, 1999

(30) Foreign Application Priority Data

May 12, 1998 (FI) ................................... 981050

(51) Int. Cl.[7] ........................... H04L 12/28; H04Q 7/20
(52) U.S. Cl. ................. 370/410; 370/392; 370/352; 455/445; 455/432
(58) Field of Search ................. 370/230, 229, 370/328, 329, 338, 352, 401, 410, 400, 389, 392, 474; 455/445, 432, 414, 436, 422, 560, 524; 375/222, 377, 211

(56) References Cited

U.S. PATENT DOCUMENTS

| 5,608,779 | A |   | 3/1997  | Lev et al. |         |
|-----------|---|---|---------|-----------------|---------|
| 5,867,784 | A | * | 2/1999  | Lantto          | 455/432 |
| 5,987,327 | A | * | 11/1999 | Lev et al.      | 370/328 |
| 6,064,887 | A | * | 5/2000  | Kallioniemi et al. | 455/432 |
| 6,138,022 | A | * | 10/2000 | Strawczynski et al. | 370/238 |

* cited by examiner

*Primary Examiner*—Vivian Chin
*Assistant Examiner*—John J Lee
(74) *Attorney, Agent, or Firm*—Nixon & Vanderhye, PC

(57) ABSTRACT

The present invention relates to a method and an arrangement and an apparatus for implementing and monitoring a call in a telecommunications system in which the call is routed from a first transceiver to a second transceiver via a first switching center and a second subsequent switching center. In the solution a call setup message from the first switching center to the second switching center includes an address of said first switching center, the call setup message is intercepted at a telecommunications node intermediate to the first and second switching centers, whereafter the address of the first switching center is replaced with an address of the intermediate node. The call set up message transmission is forwarded then to the second switching center, and a response message including call set up information and using end to end signalling is transmitted from said second switching center, said response message using said substitute address of the intermediate node and being terminated in the intermediate node.

27 Claims, 5 Drawing Sheets

METHOD AND APPARATUS IN A TELECOMMUNICATIONS SYSTEM

FIELD OF THE INVENTION

The present invention relates to a method in a telecommunications network for use in management and/or control of a call between two transceivers. The invention relates further to an arrangement and an apparatus for use in a telecommunications network for performing call management and/or control operations.

BACKGROUND OF THE INVENTION

A cellular radio telecommunication system or a Public Land mobile Network (PLMN) comprises a Mobile Services Switching Centre (MSC) for controlling and/or managing communications of a Mobile Station (MS) connected to the network system. The Mobile Station (MS) communicates with the MSC through a Base Station Subsystem (BSS), to which the MS is connected over a radio (i.e. air) interface between a Base Station (BS) of the Base Station Subsystem (BSS) and the MS. The MSC includes databases so as to enable an operation of the system. The databases are such as a Home Location Register (HLR) and a Visitor Location register (VLR) and additional databases for further subscriber information and billing operations etc.

MSCs can be divided e.g. to Visited MSCs (VMSC) and Transit MSCs (TMSC) or Gateway MSCs (GMSC). From these the VMSC is a MSC which used by a subscriber who is having a connection to a base station connected to this particular MSC. The TMSCs or the GMSCs are, in turn, used as nodes for possible routing and switching operations in the communications path between, i.e. intermediate, two VMSCs, or between a VMSC and any other exchange or switching point, or even between two TMSCs. Therefore, when a call is established between two mobile stations, the call is also accomplished between an originating VMSC and a terminating VMSC, and there may be one or several intermediate MSCs between the VMSCS.

In the mobile radio telecommunications systems or the PLMN the speech and other messaging is coded in the transmitting Mobile Station or similar transmitting and receiving terminal (transceiver), such as voice mail box, before the transmission thereof by using an appropriate coding technique. For example, in Personal Digital Cellular (PDC) system a VSELP (Vector Sum Excited Linear Prediction) 11.2 kbit/s speech coding is used on the full rate channel and a PSI-CELP (Pitch Synchronized Innovation— Excited Linear Prediction) 5.6 kbits/s speech coding is used on the half rate channel over an air or radio interface to the Base Station.

When having a speech call from a PLMN to a fixed network, such as to a Public Switched Telephone Network (PSTN), or to an Integrated Digital Services Network (ISDN), a transcoder or codec is connected to the originating Mobile Services Switching Centre (VMSC) controlling the radio interface between the BSS and the calling mobile station. The transcoder is used to convert the VSELP/PSI-CELP coded speech to a PCM (Pulse Code Modulation) $\mu$-law coded speech so as to enable communication towards the PSTN.

When having a connection between two mobile transceiver stations, the VSELP/PSI-CELP coded speech is transmitted transparently over the PLMN network. In this instance the transcoders are through connected during the connection so as to avoid a conversion of e.g. a VSELP/PSI-CELP coded speech to a PCM $\mu$-law coded speech and then back to VSELP/PSI-CELP coded speech, which would decrease the speech quality at the receiving end.

However, the transcoders are active, i.e. converting the VSELP/PSI-CELP coded speech to the PCM $\mu$-law coded speech during the call setup in order to enable listening of announcements and tones from the telephone network. After the setup is completed, the transcoders are changed or switched to the through connected mode by means of a specific codec control signalling by using a Mobile Application Part (MAP) over a system 7 signalling (#SS7).

There are PLMN arrangements, such as the PDC, in which the codec control signalling occurs as end-to-end signalling, i.e. the air interface is coded from one end to the other. The messages are addressed with a Network Code (NC) and a Signalling Point Code (SPC) of the designated Visited Mobile Services Switching Centre (VMSC). The addresses are carried in an ISUP (Integrated Services Digital Network User Part) signal as an IAM (Initial Address Message).

The codec control signalling is performed for basic calls only according to a DMNI (Digital Mobile Communications Network Internode Interface) standard. For example, at forwarded calls the codec control is not performed, but the PCM $\mu$-law speech coding is always used between the originating VMSC and the terminating VMSC. This, however, causes a remarkable decrease in speech quality.

Since the codec control signalling occurs as an end-to-end signalling, the intermediate nodes or connection points, like transit exchanges or MSCs or Service Switching Points (SSP) providing Intelligent Network (IN) services, are not able to know the speech coding used in the communications. This is a disadvantage e.g. in cases where monitoring equipment or similar, or an announcement should be connected to the call. As the coding in use is not exactly known, the system is not aware of the coding by which announces, messages, information, tones etc. should be transmitted to the mobile station(s) or which coding should be used to decode received announces, tones, control messages etc. In addition, it is not possible to affect and control the used coding during the connection (e.g. it is not possible to change the mode of the coding e.g. from VSELP to $\mu$-law coding during the call), which might be required e.g. in cases where a conference call with a third party should be set up during an already existing call between two parties. In case this information is to be transmitted separately from the terminating (or originating) VMSC to the intermediate node later on during or after the setup, a separate and additional messaging arrangement for this is needed.

SUMMARY OF THE INVENTION

It is an object of the present invention to overcome the disadvantages of the prior art solutions and to provide a new type of solution for controlling and/or managing a call using end to end signalling.

An object of the present invention is to provide a solution by means of which the management and monitoring of calls is made easier to accomplish in the intermediate nodes of a Land Mobile Network.

An object of the present invention is to provide a solution by means of which unnecessary coding/decoding in a call between two transceivers communicating through a cellular system is avoided.

An object of the present invention is to provide a solution by means of which a delay and/or additional signalling in switching additional features and/or services to a call implemented by means of end-to-end signalling is avoided.

An object of the present invention is to provide a solution in which speech quality of a call between two mobile stations is improved.

An object of the present invention is to provide a solution by means of which switching operations, such as switching a call to Intelligent Network service applications or switching of monitoring apparatus or announcements to a call, can be eased.

The objects are obtained by a method of implementing a call in a telecommunications system, the call being routed from a first transceiver to a second transceiver via a first switching centre and a second subsequent switching centre, the method comprising:

including in a call setup message from the first switching centre to the second switching centre an address of said first switching centre;

intercepting the call setup message at a telecommunications node intermediate to the first and second switching centres;

replacing the address of the first switching centre in the setup message from the first switching centre with an address of the intermediate node;

forwarding the call set up message transmission to the second switching centre; and sending a response message including call set up information and using end to end signalling from said second switching centre, said response message using said substitute address of the intermediate node and being terminated in the intermediate node.

An embodiment of the invention provides an arrangement in a telecommunications system, said arrangement comprising:

a first transceiver, a second transceiver, a first switching centre through which the first transceiver may communicate and which has a first address, a second switching centre through which the second transceiver may communicate and which has a second address, a communication path between the first switching centre and the subsequent second switching centre, an intermediate node in the communication path between said first switching centre and said second switching centre, a call from the first transceiver to the second transceiver being routed through said intermediate node, wherein the arrangement is such that the intermediate node is arranged to intercept the address the first switching centre included in a setup message of the call, and to replace said address with an address of the intermediate node, whereby responding messages using end to end signalling from the second switching centre concerning the call are addressed to the intermediate node.

According to an embodiment an intermediate switching centre for use in a communication path between a first switching centre and a subsequent second switching centre of telecommunications system is provided, wherein a call from a first transceiver to a second transceiver is routed through said intermediate switching centre, and wherein the intermediate switching centre is arranged to intercept and replace an address of the first switching centre contained in a setup message of the call with a new address, whereby response messages implemented by means of end to end signalling from the second switching centre are addressed to a destination designated by said new address.

Several advantages are obtained by means of the present invention, since the solution provides a simple and reliable manner for call management and control. The solution enables monitoring of calls using end to end signalling (e.g. calls from a mobile station to another mobile station or transceiver in a PDC system) in intermediate nodes, such as transit MSCs. The solution enables further a change of a transcoder mode by the intermediate nodes for supporting services provided by an intelligent network (IN). In addition, delays in the signalling and amount of undesired signalling can be decreased, and the quality of calls from a mobile station to another mobile station call can be improved.

In the following the present invention and the other objects and advantages thereof will be described in an exemplifying manner with reference to the annexed drawings, in which similar reference characters throughout the various figures refer to similar features.

BRIEF DESCRIPTION OF THE DRAWINGS

FIG. 6 discloses a network arrangement including an IN.

DETAILED DESCRIPTION OF THE DRAWINGS

To give a better understanding of the invention, prior art arrangements for telecommunication networks as well for signalling and coding/decoding operations will be firstly shortly described with reference to FIGS. 1 to 3.

Figure 1:
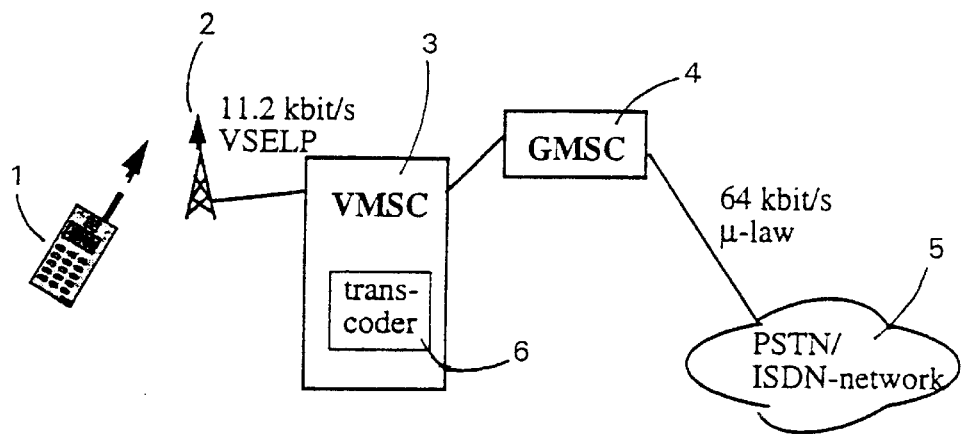
FIGS. 1 and 2 are schematic presentations of prior art calls from a mobile station to a PSTN and a PLMN networks, respectively.

FIG. 1 is a schematical presentation of a prior art speech call from a PLMN mobile station MS 1 to a fixed network, such as to a Public Switched Telephone Network (PSTN) 5 or an Integrated Digital Services Network (ISDN), through a base station 2, an originating Mobile Services Switching Centre (MSC) 3 and a Gateway MSC 4. The originating Mobile Services Switching Centre (MSC) 3 controls the communications between the base station 2 and the calling mobile station 1. A transcoder 6 is connected to or implemented in the originating MSC 3. The transcoder 6 is used to convert the VSELP/PSI-CELP coded speech to a PCM (Pulse Code Modulation) $\mu$-law coded speech as disclosed by FIG. 1 so as to enable communication towards the PSTN.

Figure 2:
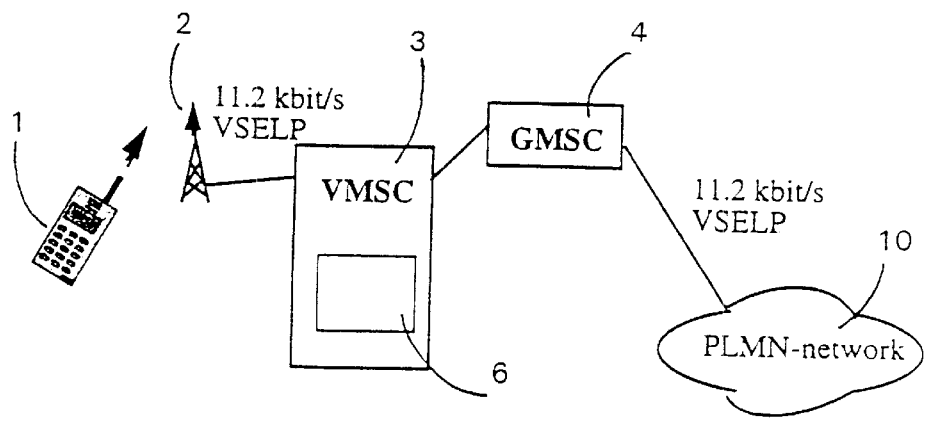

FIG. 2 discloses a situation in which a connection is established between a mobile station 1 and a further mobile station connected to a Public Land Mobile Network (PLMN) 10. In this a VSELP/PSI-CELP coded speech is transmitted transparently over the PLMN network 10. The transcoder 6 is through connected during the connection so as to avoid any conversions of e.g. a VSELP/PSI-CELP coded speech to a PCM $\mu$-law coded speech as was disclosed by FIG. 1 and then back to VSELP/PSI-CELP coded speech, which would decrease the speech quality at the receiving mobile station end.

However, during the call setup stage the transcoder 6 is in an active state, i.e. converting the VSELP/PSI-CELP coded speech to the PCM $\mu$-law coded speech, so as to enable the listening of announcements and tones from the telephone network. Only after the setup is completed, the transcoder 6 is switched to the through connected mode by means of a specific codec control signalling by using a Mobile Application Part (MAP) over a system 7 signalling (#SS7).

Figure 3:
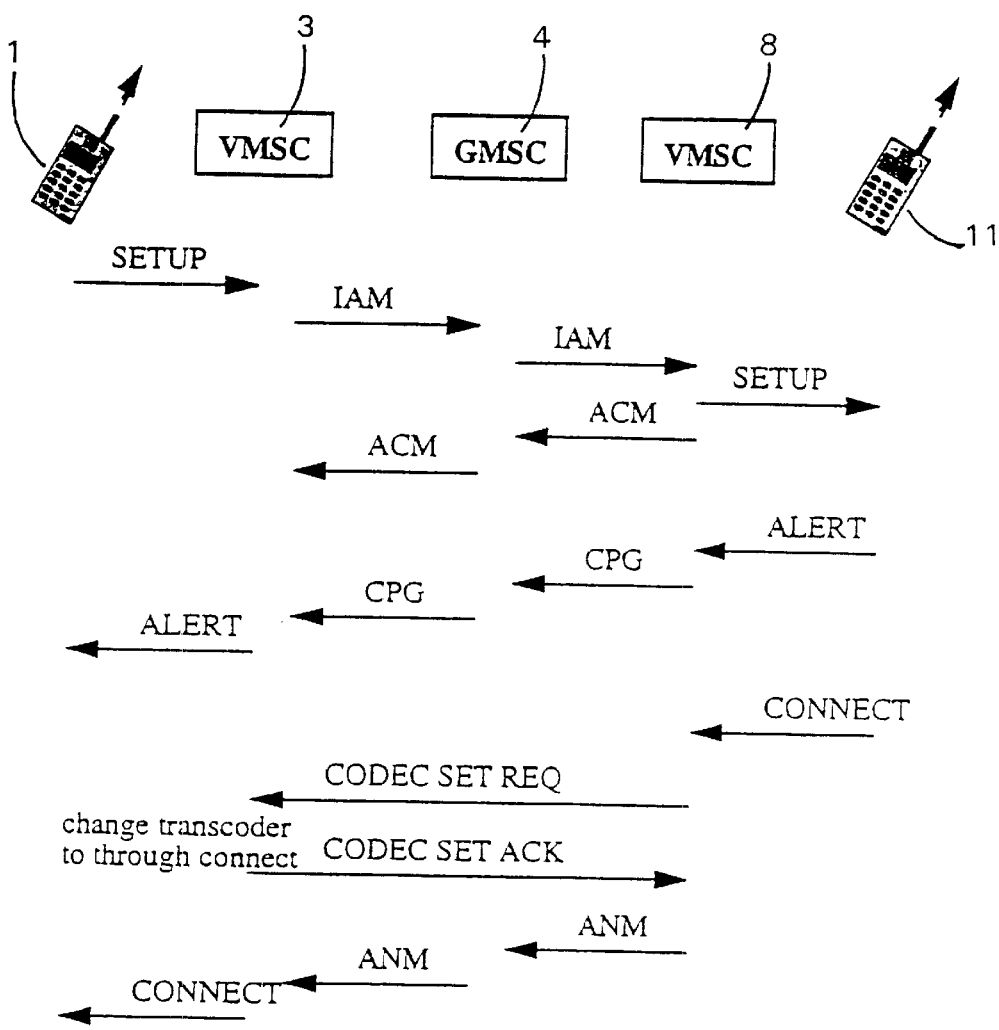
FIG. 3 is a schematic signalling chart of the prior art signalling during a call setup between two mobile stations.

FIG. 3 discloses an example of the call setup signalling of a call between a first and a second mobile stations 1 and 11, respectively, through an originating or first MSC 3, a gateway or transit MSC 4 and a terminating or second MSC 8. The messages sent as response from the terminating MSC 8 and using end to end signalling include information concerning set-up requirements for the transcoder (CODEC SET REQ), which messaging is then acknowledged by the originating MSC 3. As is disclosed by FIG. 3, the transcoder of the prior art arrangement is to the through connected mode at this stage (i.e. to the end to end signalling mode).

The addresses for the codec control are transferred in the ISUP (ISDN User Part) messages, e.g. as an IAM (Initial Address Message) and an ACM (Address Complete Message). The messages may be addressed by a Network Code (NC) and signalling point code (SPC) of the destination node (i.e. MSC). As the used MAP signalling is connectionless signalling, the IAM and ACM are both carrying also a call reference, which is generated by the sending node (by the originating MSC for the IAM and by the terminating MSC for the ACM) and which identifies the particular call within the sending node which initially generated it. The call references are included in the codec control messages and thus they are used to identify the call in the node or nodes.

So as to enable an improved management and/or control of the signalling, the intermediate node (such as intermediate connection points or switching points or transit exchanges or transit MSCs or gateways) is arranged to terminate the end to end signalling by replacing the address of the respective MSC in the call routing information with it's own address and by generating a new call reference in the ISUP signalling (for both the IAM and the ACM).

Figure 4:
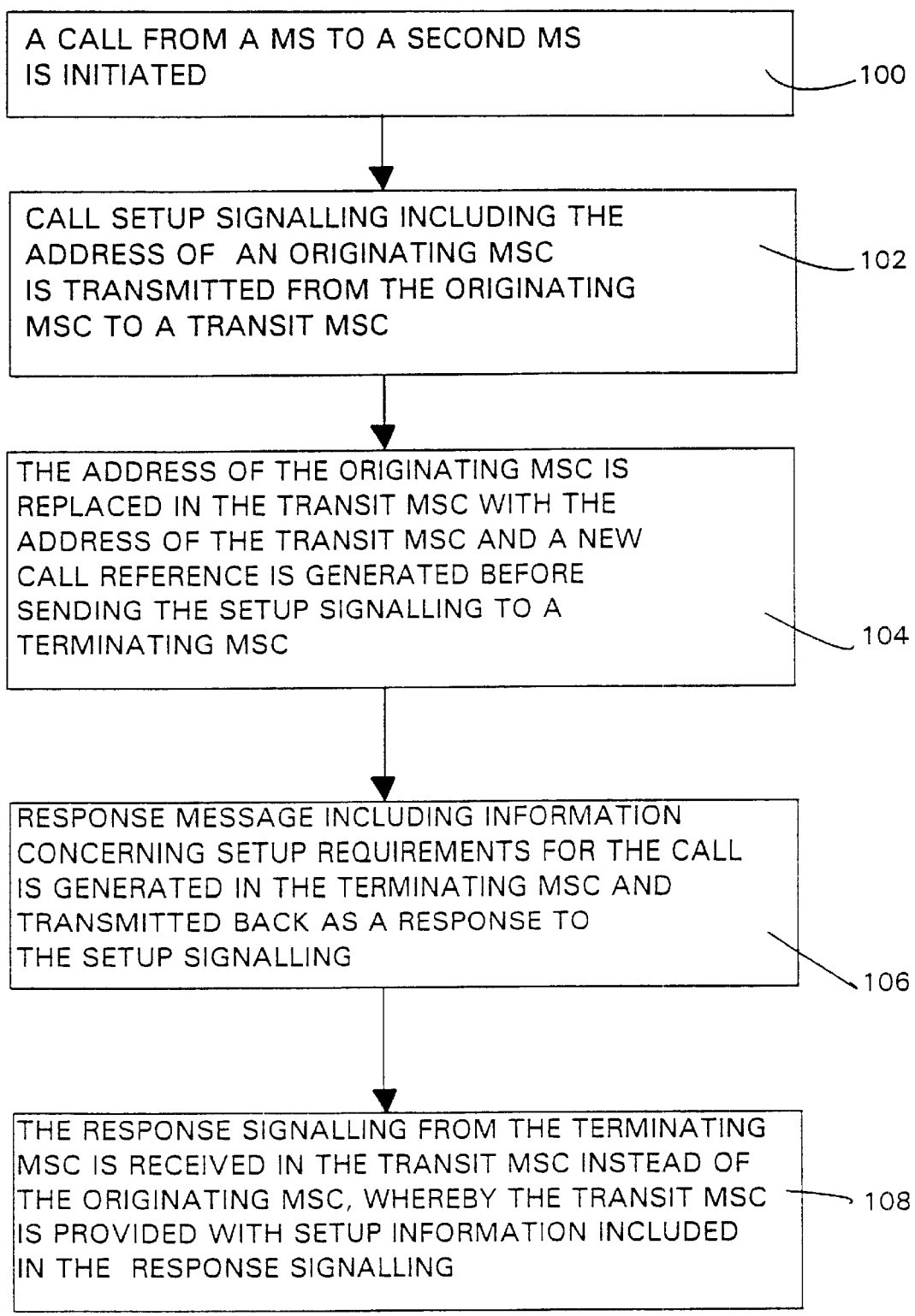
FIG. 4 is a flow chart for one embodiment in accordance with the present invention.

More precisely, this can be accomplished in a manner as disclosed by flow chart of FIG. 4, in which the change of the address and the generation of the new address in the ISUP signal is accomplished at step 104 when setting up the call between two mobile stations and before the signalling is transmitted further to a terminating MSC, whereby it is possible to make the intermediate node as an active party in the signalling.

In other words, while the terminating MSC believes to transmit the set-up requirements and other signalling directly to the originating MSC at step 106, it indeed addresses the messages to the intermediate node. Thus the terminating MSC becomes "forced" to send the codec set-up requirements to the intermediate node (e.g. a switching point or transit MSC) instead of the originating MSC when responding to the call setup signalling.

Thereafter the intermediate node can, for instance, accomplish the following operations: 1) relay the message to the originating MSC by using the address and call reference received from the ISUP signalling and stored in the intermediate node, or 2) reject the change of the transcoder mode, whereby the communication is continued by using e.g. μ-law speech coding in conventional manner.

Figure 5:
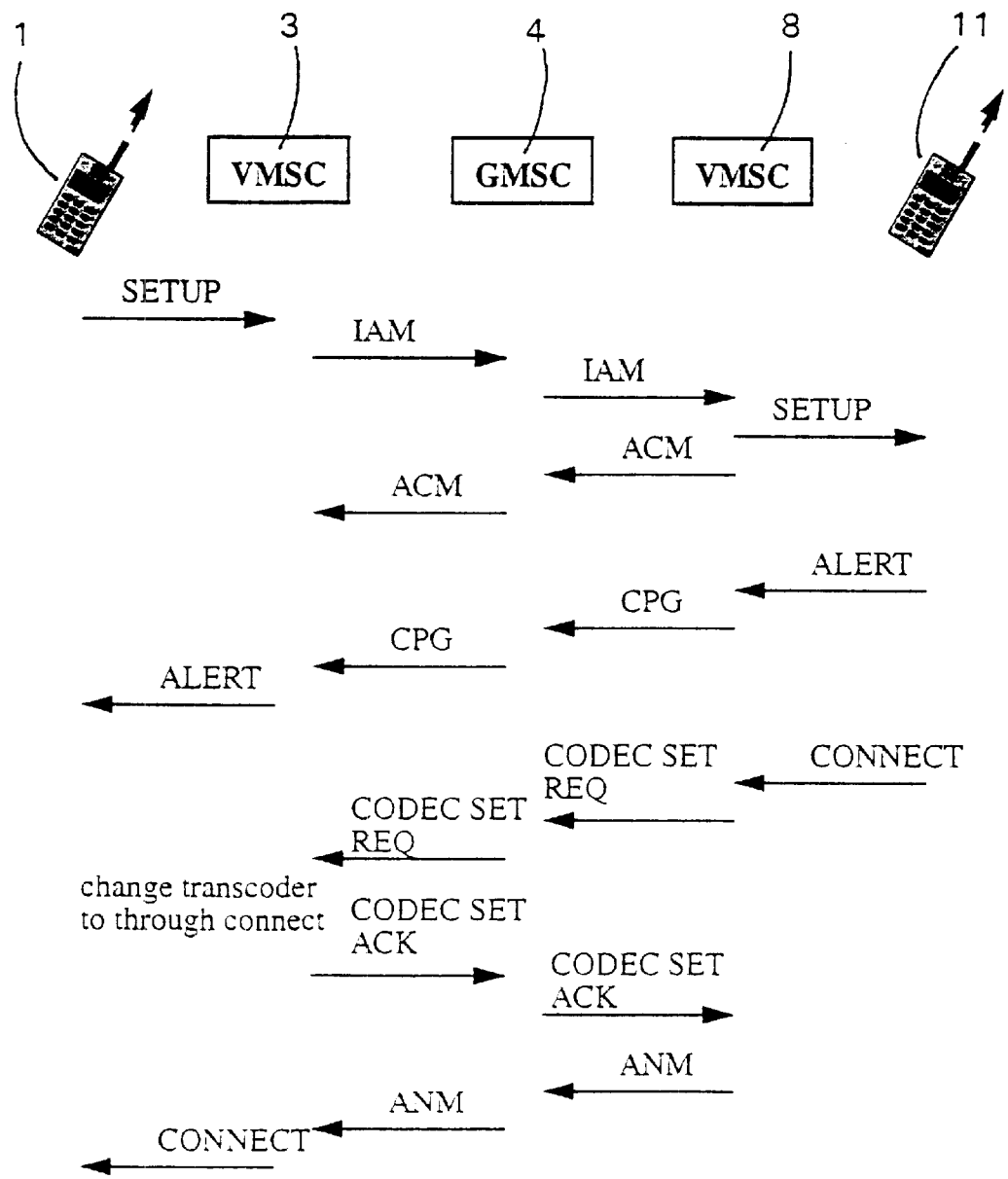
FIG. 5 is a schematic signalling chart in accordance with the present invention.

FIG. 5 discloses a signalling chart for the above described operation. As can be seen, the call is initiated by sending an IAM (Initial Address Message) from the originating MSC 3 to the terminating MSC 8 through an intermediate or transit MSC 4. The address and the call reference are intercepted and changed in the transit MSC 4, whereafter a modified IAM will be transmitted to the terminating MSC 8. The terminating MSC 8 responses by sending an ACM (Address Complete Message), whereafter the call reference of the ACM is replaced by the intermediate transit exchange or MSC 4. Thereafter a CPG (Call Progressing) message is sent to the originating MSC 3. The intermediate MSC 4 receives the CPG message and routes it further to the originating MSC 3.

After the connection is established, the signalling is switched to the end to end mode. The terminating MSC 8 transmits subsequently a CODEC SET REQ message, which is, however, not routed directly to the originating MSC 3 due to the modified address and call reference, but is terminated in the intermediate MSC 4. The intermediate MSC 4 sends back an acknowledgment that the requirements are received (CODEC SET ACK). Thereafter the call will be connected between the mobile stations 1 and 11.

It is to be noted herein that even though the information concerning the setup requirements for the codecs is transmitted as end to end signalling, there can be other messages which are not transmitted as end to end signalling.

Figure 6:
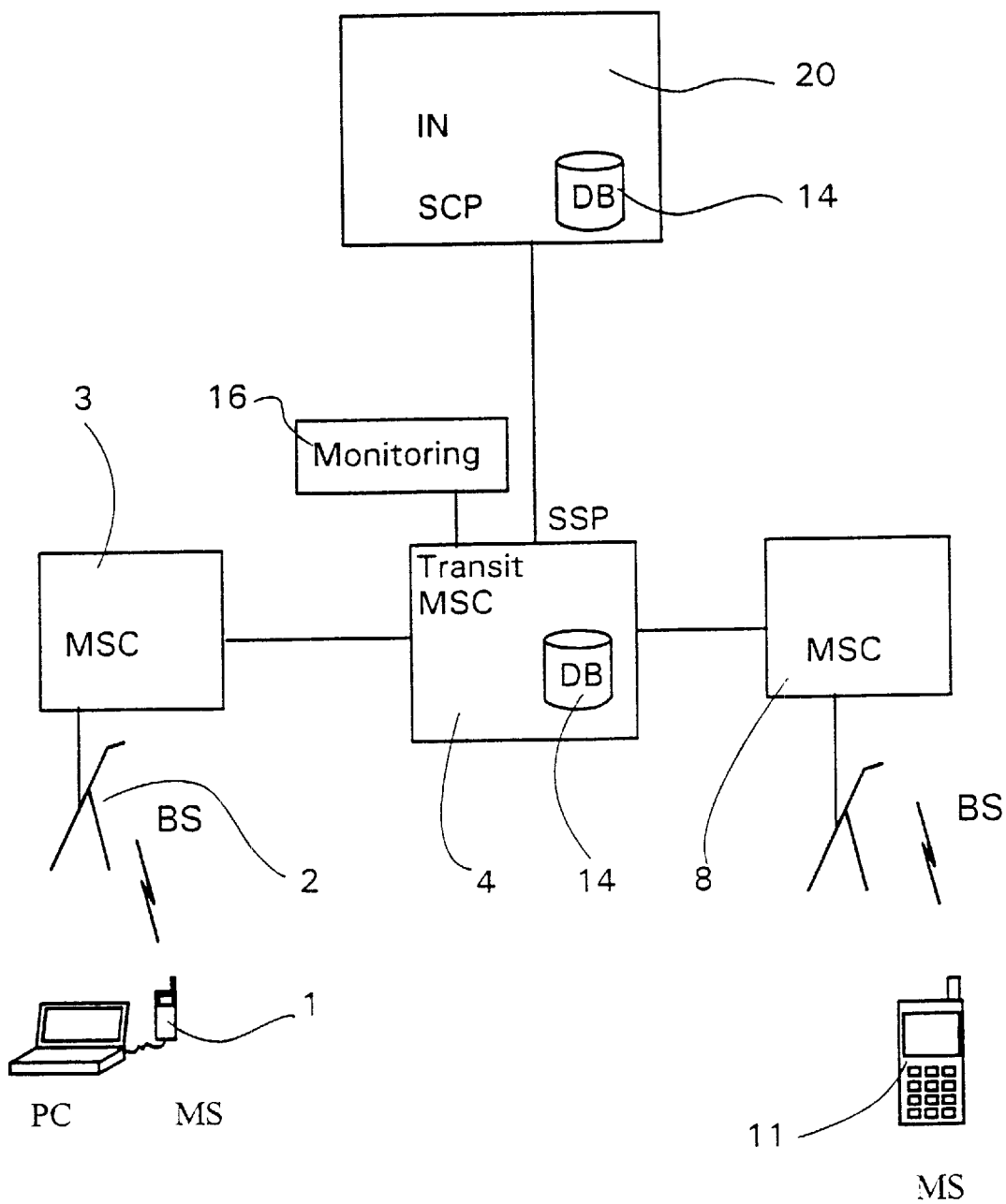

FIG. 6 discloses one possible network arrangement including an originating MSC 3, a transit MSC 4 and a terminating MSC 8 operable in a manner already explained above.

The intermediate node, i.e. the transit MSC 4 or the combination of the MSC 4 and an IN 20 of FIG. 6, is capable of storing information about the used speech coding in appropriate memory or database 14 thereof. This information can also be retrieved from the database or memory and used later on during the call. In addition, the intermediate node is also capable of connecting an appropriate monitoring apparatus 16 to the call depending on the used speech coding for enabling monitoring of the call by the most appropriate manner. The monitoring may include, for instance, speech quality supervision, call content monitoring etc. monitoring operations requiring a knowledge of the used coding.

As already shortly referred to, FIG. 6 discloses further an Intelligent Network service arrangement comprising a Service Control Point (SCP) connected through a Service Switching Point (SSP) to the transit MSC 4. An Intelligent Network IN may be defined as an architecture which can be applied to the most of the communications networks regardless the used network technology. The object thereof is to create, control and manage teleservices providing surplus value. One special feature of the IN is to be able to provide modular operations which can be linked to each other as components when creating new services, whereby the definition and designing of will become easier. The services are separated from the physical network structure which is disposed at the lowest level, and thus it is possible to distribute them. CCITT (International Telegraph and Telephone Consultative Committee) has defined so called Intelligent Network Conceptual Model (INCM) of the intelligent network in the recommendation CS-1 (Capability Set 1), which is incorporated herein by reference.

The intermediate node may preferably be capable of changing the speech coding during the call by forcing the originating and terminating MSCs 2 and 8 to change the transcoder mode by sending CODEC SET REQ messages to the respective MSCs. This feature can be used to support use of the IN (Intelligent Network) services provided through the SSP, and the switching and/or coding operations required to access the IN services. This makes it e.g. possible to send announcements and/or to connect conference call devices to the call in order to support multiparty services or connection of operators. Conventionally the announcements have been stored as a PCM μ-law coded format. Now, since the IN is capable of changing the transcoder mode in the originating/terminating MSC, it is possible to avoid a need for implementing transcoders in the SSP of the IN or for storing announcements in various different formats (e.g. in PCM, VSELP, PSI-VSELP). The supported intelligent network service can thus give various announcements or control messages or tones or similar to the transceivers. This can also work in other way, i.e. it is also possible for the transceivers to give control signals to the intelligent network supported service. The conference call devices supporting PCM $\mu$-law coding can also be used for MS-to-MS calls, since the IN can change the transcoder mode of a call between the mobile stations when a need for a conference call arises.

It is to be noted that as the intermediate node may comprise e.g. a transit MSC or a combination of a transit MSC providing a service switching point SSP for the intelligent network (IN)and an intelligent network, or some other apparatus or functionality having an address of its own, the address of the intermediate node replacing the original address may be any address provided by the intermediate node, e.g. the address of the switching centre or the address of the intelligent network.

It is to be noted also that there may, naturally, be more than one intermediate node in the communications path, and that each of these may accomplish the above described operations. Thus the address and call reference of a call may be changed in several points between the calling and receiving end of the call.

In addition, it also to be noted that even though the above describes an end to end signalling arrangement between two mobile stations, at least the other one of these could be of some other type of a transceiver, such as a voice mail implemented in the telecommunications system or some other type of service implemented in the system.

Thus, the invention provides a method, an arrangement and an apparatus by means of which a significant improvement can be achieved in the area of telecommunications. The solution according to the present invention is easy and economical to realize by per se known components. It should be noted that the foregoing examples of the embodiments of the invention are not intended to restrict the scope of the invention to the specific forms presented above but the present invention is meant rather to cover all modifications, similarities and alternatives which are included in the spirit and scope of the present invention, as defined by the appended claims. All additional embodiments, modifications and applications obvious to those skilled in the art are thus included within the spirit and scope of the invention as set forth by the claims appended hereto.

What is claimed is:

1. A method of implementing a call in a telecommunications system, the call being routed from a first transceiver to a second transceiver via a first switching centre and a second subsequent switching centre, the method comprising:

including in a call setup message from the first switching centre to the second switching centre an address of said first switching centre;

intercepting the call setup message at a telecommunications node intermediate to the first and second switching centres;

replacing the address of the first switching centre in the setup message from the first switching centre with an address of the intermediate node;

forwarding the call set up message transmission to the second switching centre; and sending a response message including call set up information and using end to end signalling from said second switching centre, said response message using said substitute address of the intermediate node and being terminated in the intermediate node.

2. A method according to claim 1, wherein it further includes as a subsequent steps to receiving the responding message at the intermediate node:

replacing the address of the second switching centre in the responding message with an address of the intermediate node; and forwarding the response message transmission to the first switching centre and sending a further response message implemented by means of end to end signalling from said first switching centre using said substitute address of the intermediate node, whereby it becomes addressed to the intermediate node.

3. A method according to claim 1, wherein each of the messages contains further a call reference, and wherein a new call reference is generated in the messages when replacing the original address of the originating switching centre with the address of the intermediate node.

4. A method according to claim 1, further including a step for determining codec setup requirements in the intermediate node from the messages forwarded as response to the call setup and including said setup requirements.

5. A method according to claim 1, wherein, after having received the response message from the second switching centre in the intermediate switching centre, the response message is relayed further from the intermediate switching node to the first switching centre by using the address of the first switching centre stored in the intermediate node.

6. A method according to claim 1, further including a step for rejecting a change of codec mode in the first and second switching centres so that the communication therebetween is continued using a default speech coding, such as $\mu$-law speech coding.

7. A method according to claim 1, further including a step for connecting monitoring apparatus to the call in the intermediate node in accordance with speech coding in use, whereby monitoring of the calls using end to end signalling is enabled in the intermediate node.

8. A method according to claim 1, further including a step for changing speech coding mode during the call by the intermediate node by sending new set-up requirements to the first switching center and second switching centre from the intermediate node.

9. A method according to claim 1, further including a step for changing codec mode by the intermediate node during the call so as to support a service implemented by means of an Intelligent Network (IN).

10. A method according to claim 9, wherein the supported intelligent network service is a conference call between at least three parties.

11. A method according to claim 9, wherein the supported intelligent network service gives various announcements or control messages or tones or similar to the transceivers or one of the transceivers gives control signals to the intelligent network supported service.

12. A method according to claim 1, wherein at least one of the transceivers is a mobile station and the switching centres comprise both a Mobile Services Switching Centre.

13. A method according to claim 1, wherein the intermediate node comprises a transit switching centre or a transit switching centre providing a service switching point for an intelligent network (IN) and an intelligent network service, whereby the address of the intermediate node is either the address of the switching centre or the address of the intelligent network.

14. An arrangement in a telecommunications system, comprising:

a first transceiver;

a second transceiver;

a first switching centre through which the first transceiver may communicate and which has a first address;

a second switching centre through which the second transceiver may communicate and which has a second address;

a communication path between the first switching centre and the subsequent second switching centre, an intermediate node in the communication path between said first switching centre and said second switching centre, a call from the first transceiver to the second transceiver being routed through said intermediate node;

wherein the arrangement is such that the intermediate node is arranged to intercept the address the first switching centre included in a setup message of the call, and to replace said address with an address of the intermediate node, whereby responding messages using end to end signalling from the second switching centre concerning the call are addressed to the intermediate node.

15. An arrangement according to claim 14, wherein the intermediate node is arranged to replace address of the second switching centre in the responding message with an address of the intermediate node.

16. An arrangement according to claim 14, wherein the set-up message and the response message contain further a call reference, and the intermediate node is arranged to generate a new call reference to the messages when replacing the addresses thereof.

17. An arrangement according to claim 14, wherein the intermediate node is arranged to determine codec set-up requirements from the response message including information concerning said requirements.

18. An arrangement according to claim 14, wherein the intermediate node further includes means for storing the addresses of the switching centres.

19. An arrangement according to claim 14, wherein a monitoring apparatus is connected to the call in the intermediate node in accordance with the speech coding used in said call.

20. An arrangement according to claim 14, wherein the intermediate node is arranged to manage the used speech coding during the call, and to change, if required, the used speech coding during the call, by sending new codec setup requirements to the first and the second switching centres.

21. An arrangement according to claim 14, wherein the intermediate node implements Intelligent Network (IN) services.

22. An arrangement according to claim 14, wherein at least one of the transceivers is a mobile station, the first switching centre and the second switching centre are mobile services switching centres, and the intermediate node comprises a transit mobile services switching centre.

23. An intermediate switching centre for use in a communication path between a first switching centre and a subsequent second switching centre of telecommunications system, wherein a call from a first transceiver to a second transceiver is routed through said intermediate switching centre, and wherein the intermediate switching centre is arranged to intercept and replace an address of the first switching centre contained in a setup message of the call with a new address, whereby response messages implemented by means of end to end signalling from the second switching centre are addressed to a destination designated by said new address.

24. An intermediate switching centre according to claim 23, wherein the new address is an address of the intermediate switching centre or an intelligent network service accessible through said intermediate switching centre.

25. An intermediate switching centre according to claim 23, wherein the intermediate switching centre or the intelligent network service is arranged to manage codec set-up requirements and also to determine the codec set-up requirements from messages received as response from the second switching centre.

26. An intermediate switching centre according to claim 23, further including means for storing the address of the first switching centre received in the setup message during the set up of the call.

27. An intermediate switching centre according to claim 23, further including a monitoring apparatus used in accordance with speech coding detected by the intermediate switching centre from a message from the second switching centre.

* * * * *